W. T. M. BRUNNEMER.
TRACTION WHEEL.
APPLICATION FILED MAY 24, 1912.
1,104,957.
Patented July 28, 1914.
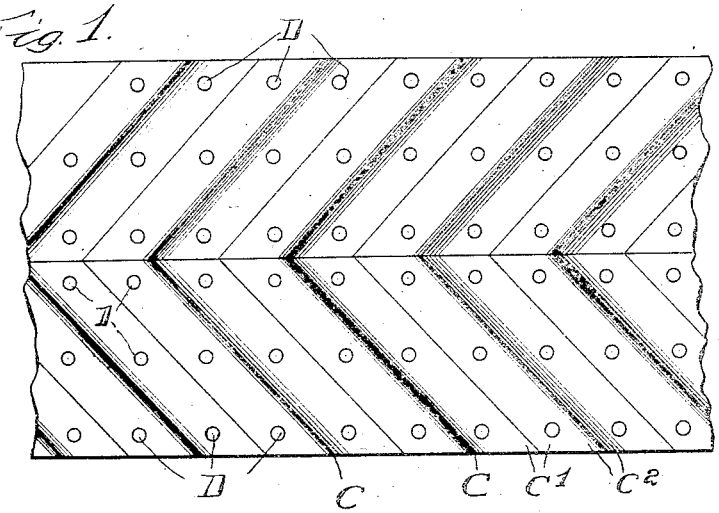
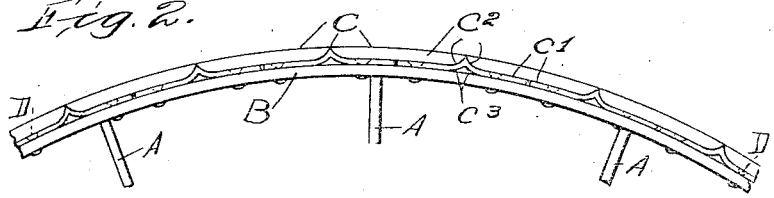
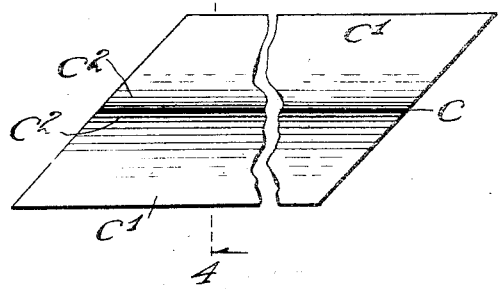
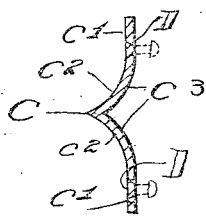
Inventor:
William T. M. Brunnemer

UNITED STATES PATENT OFFICE.

WILLIAM T. M. BRUNNEMER, OF LAPORTE, INDIANA, ASSIGNOR OF ONE-HALF TO M. RUMELY COMPANY, OF LAPORTE, INDIANA, A CORPORATION OF INDIANA.

TRACTION-WHEEL.

1,104,957.  Specification of Letters Patent.  Patented July 28, 1914.

Application filed May 24, 1912. Serial No. 699,464.

*To all whom it may concern:*

Be it known that I, WILLIAM T. M. BRUNNEMER, a citizen of the United States, residing at Laporte, in the county of Laporte and State of Indiana, have invented a certain new and useful Improvement in Traction-Wheels, of which the following is a specification.

My invention relates to tractor wheels and is illustrated in the accompanying drawings, wherein—

Figure 1 is a plan view of a part of a wheel; Fig. 2 a side elevation; Fig. 3 is a detail view of one of the flat sides; Fig. 4 is a sectional view taken along the lines 4—4 of Fig. 3.

Like parts are indicated by the same letters in the figures.

A, A are the spokes and B the rim of a wheel. The combined rim reinforcement and traction cleat structure consists of a series of angle irons diagonally cut at their ends and bent as indicated. Each has the sharp angle C, the flat sides $C^1$, $C^1$, the concave curves $C^2$, $C^2$ and the convex curves $C^3$, $C^3$. Each is held in place by a series of preferably countersunk bolts D or rivets and all are preferably arranged as indicated in Fig. 1. They are preferably cut at their ends at an inside angle of 45 degrees and associated with a wheel rim of such width that a transverse line across the periphery of the wheel at any point always intersects two or more of such sharp edges. The reinforcement cleats are placed closely together as indicated so that the entire surface of the rim is reinforced.

Of course, the precise form and shape of the reinforcement cleat and the material of which it is made, as also the arrangement of such reinforcement cleats on the rim, may be varied without departing from the spirit of my invention. The angle at the ends might be varied responsive to variation in width of the wheel rim. The preferred form of the device, however, is substantially as I have shown and described.

The use and operation of my invention are as follows: By having the outward edge of the cleat sharp and by having the grooves between the sharp edges smooth and continuously curved, the cleat readily enters the ground so as to secure a strong grip thereon and at the same time it is self-cleaning so as to avoid the packing and filling of earth into the groove between the sharp edges. By arranging the reinforcement cleats so that their sharp edges overlap, that is, so that the line of surface bearing before it leaves the edges of one pair of cleats is upon the edges of the next pair, the wheel is given a continuous bearing on its outermost periphery, thus avoiding the irregularity of action and jolting incident to some other arrangement.

By making the cleats in the shape shown and bringing their contiguous edges into close proximity, the rim of the wheel is entirely reinforced and protected. By making these cleats of angle iron, and particularly when their ends are cut at 45 degrees, the work of building up the cleats and protecting the wheel rim is accomplished in a very easy manner and with inexpensive material and without waste. The sharp edges are uniformly distant from each other at all points in any given plane parallel with the edge of the wheel. By using the angle bar I obtain a relatively sharp outer edge whose side surfaces are inclined to each other at an angle of 90 degrees.

I claim:

The combination with a cylindrical traction wheel rim of grousers mounted thereon, made up of a plurality of flattened angle bars arranged in two opposite series inclined one to the other and intersecting at the center of the rim, the flanges of said angle bars being bent to conform with the curvature of the rim, the angle summits of said angle bars being outwardly turned to form the cutting edge of the grouser and conform substantially with the curvature of the rim, said angle bar members being so disposed about the rim that the flanges abut one against the other and completely cover the rim and that the angle summits of the successive angle bars overlap so as to form a continuous line tread about the periphery of the wheel, each of said angle bar sections or segments being separately attached to the wheel rim.

Signed at Laporte, Ind. this 20th day of May 1912.

WILLIAM T. M. BRUNNEMER.

Witnesses:
J. V. HAYES,
W. H. BENNETT.